United States Patent [19]
Yano et al.

[11] Patent Number: 5,660,952
[45] Date of Patent: Aug. 26, 1997

[54] ACTIVE MATERIAL POWDER FOR NON-SINTERED NICKEL ELECTRODE AND NON-SINTERED NICKEL ELECTRODE FOR ALKALINE BATTERY

[75] Inventors: Mutsumi Yano; Mitsuzo Nogami; Katsuhiko Shinyama; Yoshito Chikano; Koji Nishio, all of Osaka; Toshihiko Saito, Mihara-gun, all of Japan

[73] Assignee: Sanyo Electric Co., Ltd., Osaka, Japan

[21] Appl. No.: 511,434

[22] Filed: Aug. 4, 1995

[30] Foreign Application Priority Data

Aug. 4, 1994 [JP] Japan .................................. 6-183446

[51] Int. Cl.$^6$ ...................................... H01M 4/32
[52] U.S. Cl. .......................................... 429/223; 252/182.1
[58] Field of Search ............................... 429/223, 218, 429/229; 252/182.1; 423/592

[56] References Cited

U.S. PATENT DOCUMENTS

| | | |
|---|---|---|
| Re. 34,752 | 10/1994 | Oshitani et al. . |
| 4,985,318 | 1/1991 | Oshitani et al. ............... 429/223 |
| 5,366,831 | 11/1994 | Watada et al. .................. 429/223 |
| 5,393,616 | 2/1995 | Mori et al. ................... 429/223 X |
| 5,506,076 | 4/1996 | Miyamoto et al. .............. 429/223 |
| 5,523,182 | 6/1996 | Ovshinsky et al. ............. 429/223 |
| 5,549,992 | 8/1996 | Iwane et al. .................. 429/223 |

FOREIGN PATENT DOCUMENTS

| | | |
|---|---|---|
| 0544011 | 6/1993 | European Pat. Off. . |
| 0557522 | 9/1993 | European Pat. Off. . |
| 0575093 | 12/1993 | European Pat. Off. . |
| 0650207 | 4/1995 | European Pat. Off. . |
| 2731064 | 1/1979 | Germany . |
| 62-234867 | 10/1987 | Japan . |
| 62-237667 | 10/1987 | Japan . |
| 362457 | 3/1991 | Japan . |

*Primary Examiner*—Anthony Skapars

[57] ABSTRACT

An non-sintered nickel electrode of alkaline batteries uses an active material powder which comprises composite particles comprising nickel hydroxide particles or solid solution particles consisting essentially of nickel hydroxide the surface of which is covered with a mixed crystal of cobalt hydroxide and the hydroxide of at least one metal (M) selected from the group consisting of aluminum, magnesium, indium and zinc. With this electrode, the cobalt hydroxide, which covers as a component of the mixed crystal the surface of the nickel hydroxide particles, minimally diffuses into them. Alkaline batteries using this electrode as positive electrode can therefore maintain, for a long period of time of charge-discharge cycles, the function of the cobalt hydroxide of increasing the conductivity of the electrode, thereby suppressing decrease in the discharge capacity in the course of charge-discharge cycles.

14 Claims, 3 Drawing Sheets

ACTIVE MATERIAL POWDER FOR NON-SINTERED NICKEL ELECTRODE AND NON-SINTERED NICKEL ELECTRODE FOR ALKALINE BATTERY

BACKGROUND OF THE INVENTION

This application claims the priority of Japanese Patent Application No. 6-183446 filed on Aug. 4, 1994.

1. Field of the Invention

The present invention relates to an active material powder for non-sintered nickel electrodes of alkaline batteries such as nickel-hydrogen battery and nickel-cadmium battery and a process for producing the same, and to a non-sintered nickel electrode for alkaline batteries and a process for producing the same.

2. Description of the Prior Art

The known nickel electrode for alkaline batteries has been prepared by impregnating a substrate (sintered substrate) obtained by sintering nickel powder onto a perforated steel plate or the like, with an active material.

This type of nickel electrode is known as "sintered nickel electrode". With this sintered nickel electrode, in which particles of the nickel powder bonds together only weakly, so that increasing the porosity of the substrate causes the nickel powder to drop off from the substrate. The maximum porosity of the substrate practically attained has therefore been 80%. The sintered nickel electrode has the problem of the active material having a low packing density, since the substrate such as perforated steel plate should be provided and it cannot have a sufficiently high density.

Besides, it becomes necessary, in order to pack the sintered substrate with an active material, to employ a solution immersion process which requires repeating a complex step several times. This is because the sintered body formed by sintering has too line holes having a diameter of not more than 10 μm.

To solve the above problems, there is available what is known as "paste-type nickel electrode", which is obtained by impregnating or coating a sintered alkali-resistant metal fiber or a carbon fiber nonwoven fabric or the like plated with an alkali-resistant metal, with a slurry or paste containing nickel hydroxide (active material), a binder and solvent. However, the paste-type nickel electrode, which contains the binder and permits a conductive network to form only to a small extent, has the problem of markedly low rate of utilization of the active material.

Japanese Patent Application Laid-open Nos. 234867/1987 and 237667/1987 propose, in order to increase the utilization rate of the paste-type nickel electrode, increasing the conductivity of the surface of the active material particles by covering the surface of the nickel hydroxide particles with cobalt hydroxide. The cobalt hydroxide then dissolves in the alkaline electrolyte used and forms monovalent $HCoO_2$-ion, which is further converted into highly conductive CoOOH (cobalt oxyhydroxide) at high voltage and deposits on the surface of the nickel hydroxide particles. Likewise, Japanese Patent Application Laid-open No. 62457/1991 proposes a process of covering the surface of nickel hydroxide particles with a solid solution film of nickel hydroxide and cobalt hydroxide.

However, with the paste-type nickel electrodes obtained by the above processes, in which the cobalt hydroxide covering the surface of nickel hydroxide particles diffuses into the particles in the course of repeated charge-discharge cycles, cannot maintain over a long period of charge-discharge cycles the inherent function of cobalt hydroxide of increasing the conductivity of the surface of the electrodes. As a result, it has been very difficult to obtain a paste-type nickel electrode with the discharge capacity decreasing only to a small extent in the course of charge-discharge cycles.

SUMMARY OF THE INVENTION

Accordingly, an object of the present invention is to provide an active material powder for non-sintered nickel electrodes of alkaline batteries with which the diffusion of cobalt hydroxide covering the surface of nickel hydroxide particles into the particles is suppressed, so that the function of the cobalt hydroxide of increasing the conductivity of electrode can be maintained over a long period of charge discharge cycles.

Another object of the present invention is to provide a process for producing the above active material powder.

Still another object of the present invention is to provide a non-sintered nickel electrode for alkaline batteries which has the same effect as above.

Yet another object of the present invention is to provide a process for producing the above electrode.

The present invention provides an active material powder of non-sintered nickel electrodes for alkaline batteries, which comprises composite particles comprising nickel hydroxide particles or solid solution particles consisting essentially of nickel hydroxide and a mixed crystal covering the surface thereof, said mixed crystal comprising cobalt hydroxide and a hydroxide of at least one metal (M) selected from the group consisting of aluminum, magnesium, indium and zinc.

The present invention further provides a process for producing the above active material powder for non-sintered nickel electrodes of alkaline batteries, which comprises immersing nickel hydroxide particles or solid solution particles consisting essentially of nickel hydroxide in a solution of a cobalt salt and a salt of at least one metal (M) selected from the group consisting of aluminum, magnesium, indium and zinc, adding an alkali to the solution to co-precipitate cobalt hydroxide and a hydroxide of the metal, thereby covering the surface of the nickel hydroxide particles or solid solution particles consisting essentially of nickel hydroxide with the resulting mixed crystal of cobalt hydroxide and the hydroxide of the metal (M).

The present invention still further provides a non-sintered nickel electrode for alkaline batteries, which uses an active material powder which comprises composite particles comprising nickel hydroxide particles or solid solution particles consisting essentially of nickel hydroxide and a mixed crystal covering the surface thereof, said mixed crystal comprising cobalt hydroxide and a hydroxide of at least one metal (M) selected from the group consisting of aluminum, magnesium, indium and zinc.

The present invention yet further provides a process for producing the above non-sintered nickel electrode for alkaline batteries, which comprises: the step 1 of immersing nickel hydroxide particles or solid solution particles consisting essentially of nickel hydroxide in a solution of a cobalt salt and a salt of at least one metal (M) selected from the group consisting of aluminum, magnesium, indium and zinc, adding an alkali to the solution to co-precipitate cobalt hydroxide and a hydroxide of the metal (M), thereby covering the surface of the nickel hydroxide particles or solid solution particles consisting essentially of nickel hydroxide with the resulting mixed crystal of cobalt hydroxide and the hydroxide of the metal (M), to prepare an active material powder comprising composite particles, and the step 2 of coating or filling a substrate with the obtained active material powder, and drying the powder.

With the electrode of the present invention, cobalt hydroxide, which covers as a component of a mixed crystal with the hydroxide of at least one metal (M) selected from the group consisting of aluminum, magnesium, indium and zinc, the surface of the active material particles (nickel hydroxide particles or solid solution particles of nickel hydroxide), minimally diffuses into the active material particles. Alkaline batteries using the electrode of the present invention as positive electrode can therefore maintain, for a long period of time of charge-discharge cycles, the function of the cobalt hydroxide of increasing the conductivity of the electrode, thereby suppressing decrease in the discharge capacity in the course of charge-discharge cycles.

BRIEF DESCRIPTION OF THE DRAWINGS

A more complete appreciation of the invention and many of the attendant advantages thereof will be readily obtained as the same become batter understood by reference to the following detailed description when considered in connection with the accompanying drawings, wherein.

DETAILED DESCRIPTION OF THE PREFERRED EMBODIMENTS

Figure 1:
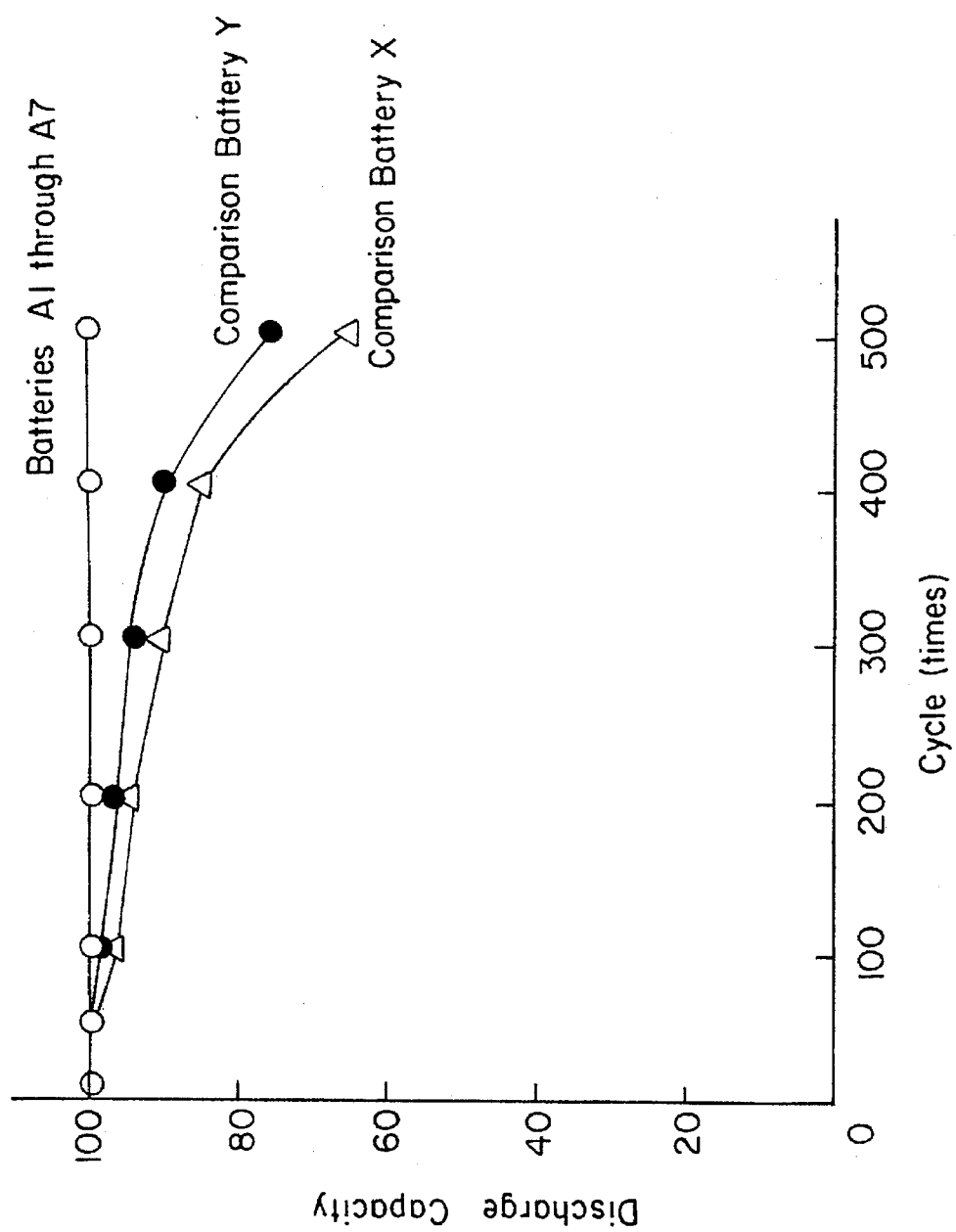
FIG. 1 is a graph showing the charge-discharge characteristic of the nickel-cadmium batteries prepared in Examples.

Among the composite particles usable in the present invention, those of nickel hydroxide or its solid solution covered with a mixed crystal of cobalt hydroxide, and magnesium oxide and/or zinc oxide; in particular those covered with a mixed crystal of cobalt hydroxide and magnesium hydroxide.

In the above case, it is desirable that the mixed crystal in the invention contain 0.5 to 50% by weight in terms of metal of magnesium hydroxide and/or zinc hydroxide, based on the total weight of cobalt, and magnesium and/or zinc contained in the mixed crystal.

If the content is less than 0.5% by weight, it will become difficult to suppress the diffusion of cobalt hydroxide into the active material particles (particles of nickel hydroxide or its solid solution) effectively and further to obtain an electrode capable of providing a battery with which the discharge capacity decreases only slightly as the charge-discharge cycles proceed. On the other hand, if the content exceeds 50% by weight, the conductivity will decrease and hence it becomes difficult to obtain an electrode capable of providing a battery the discharge capacity of which decreases only slightly as the charge-discharge cycles proceed.

It is desirable that the composite particles used in the invention contain 3 to 20% by weight of the mixed crystal (solid solution) containing cobalt hydroxide and a hydroxide of at least one metal (M) selected from the group consisting of magnesium, zinc, aluminum and indium. With a content of the mixed crystal of less than 3% by weight, which means that the amount of cobalt hydroxide is insufficient, it is difficult to increase the conductivity of the resulting electrode sufficiently and to obtain an electrode capable of providing a battery with large discharge capacity. On the other hand, with the content of mixed crystal exceeding 25% by weight, the amount of nickel hydroxide as active material becomes small and hence it becomes also difficult to obtain an electrode capable of provide a battery with large discharge capacity. In summary, the most preferable is composite particles containing 3 to 25% by weight of the mixed crystal which contains 0.5 to 50% by weight in terms of metal of cobalt hydroxide, and magnesium hydroxide and/or zinc hydroxide, based on the total weight of cobalt, and magnesium and/or present in the mixed crystal.

Salts of the above metal (M) preferably used in the processes of the present invention are sulfates and nitrates and those of cobalt are cobalt sulfate and cobalt nitrate. With use of these metal salts, impurities that impair the electrode characteristics mix into the active material particles (particles of nickel hydroxide or solid solution particles containing nickel hydroxide as a main component) only to a small extent, so that the active material particles are not particularly affected adversely. The sulfates and nitrates may be used in combination with each other and so are cobalt sulfate and cobalt nitrate. Furthermore, either or both of the sulfates and nitrates may be used in combination of 2 or more.

With the processes of the present invention and where the mixed crystal consists of cobalt hydroxide and at least one metal (M) selected from magnesium and zinc, it is desirable to adjust the composition of the solution such that the resulting mixed crystal present on the composite particles will contain the hydroxide of metal (M) in an amount in terms of metal (M) of 0.5 to 50% by weight based on the total weight of cobalt and the metal (M) contained in the mixed crystal, in general, the ratio of metals between the salt of at least one metal (M) selected from the group consisting of aluminum, magnesium, indium and zinc and the cobalt salt contained in the solution becomes equal to the ratio between the metal (M) and cobalt present in the mixed crystal. It is also desirable to adjust the amount (coating amount) of the mixed crystal precipitated on the surface of active material particles such that the resulting composite particles contain 3 to 25% by weight of the mixed crystal. The amount (coating amount) of the mixed crystal can be adjusted by adjusting the concentrations of a salt of the metal (M) and a cobalt salt in the solution. To summarize, the most preferred embodiments of the processes of the present invention use a solution containing a cobalt salt and a salt of at least one metal selected from magnesium and zinc and carry out both of the above two adjustments.

Examples of the alkali used in the process of the invention are sodium hydroxide, potassium hydroxide and lithium hydroxide.

Examples of the substrate used in the process of the invention include foamed porous metallic bodies, metal fibers, carbon fiber, metallic meshes and perforated metal plates.

Examples of solid solution particles usable for the articles and processes of the present invention are those comprising nickel hydroxide particles in which at least one element selected from calcium, zinc, cobalt or cadmium has been dissolved as solid.

EXAMPLES

Other features of the invention will become apparent in the course of the descriptions of exemplary embodiments which are given for illustration of the invention and are not intended to be limitative thereof.

Example 1

[Preparation of active material powders]

In 1,000 ml of an aqueous solution of 14.3 g of cobalt sulfate and 10.7 g of magnesium sulfate, 100 g of nickel hydroxide powder was put and a 1M aqueous sodium hydroxide solution was, with stirring, added dropwise to the mixture to a pH of 12, and the mixture was then allowed to stand for 1 hour. The pH was measured with a glass electrode pH meter equipped with an automatic temperature compensator. The obtained mixture was filtered, and the residue was washed with water and vacuum dried to yield an active material powder which comprises composite particles comprising nickel hydroxide particles the surface of which is covered with a mixed crystal of magnesium hydroxide and cobalt hydroxide. The ratio between the cobalt hydroxide and magnesium hydroxide was adjusted by adjusting the ratio between the cobalt salt (cobalt sulfate) and the magnesium salt (magnesium sulfate) to be dissolved in water. The content of the mixed crystal in the composite particles was adjusted by adjusting the amounts of the cobalt salt and magnesium salt used. The content of magnesium hydroxide in the mixed crystal was 1% by weight [Mg/(Mg+Co)×100] in terms of metal based on the total weight of cobalt and magnesium contained in the mixed crystal. The content of the mixed crystal in the composite particles was 5% by weight. Both of these values were obtained based on measurements by atomic absorption analysis.

In the same manner as above, there were prepared active material powders which comprised composite particles comprising nickel hydroxide particles the surface of which was covered with a mixed crystal of cobalt hydroxide-zinc hydroxide, cobalt hydroxide-indium hydroxide, cobalt hydroxide-aluminum hydroxide, cobalt hydroxide-magnesium hydroxide-zinc hydroxide, cobalt hydroxide-magnesium hydroxide-aluminum hydroxide or cobalt hydroxide-zinc hydroxide-indium hydroxide. Sulfates were used for all of the cobalt, zinc, indium, aluminum and magnesium materials. In each of the above, the content of the hydroxide of the metal (M) in the mixed crystal was 1% by weight in terms of metal based on the total weight of cobalt and the metal (M) contained in the mixed crystal. All of the composite particles had the same mixed crystal content of 5% by weight.

[Preparation of non-sintered nickel electrodes]

Pastes were prepared by kneading 80 parts by weight of the above active material powders and 20 parts by weight of a 1% by eight aqueous methylcellulose solution. Porous bodies formed of a nickel-plated foamed metal (porosity: 95, average particle diameter 200 μm) were each filled with each of the pastes thus prepared and then dried and shaped into non-sintered nickel electrodes.

[Preparation of batteries]

AA-size nickel-cadmium batteries A1 through A7 (discharge capacity: 1,100 mAh) were prepared by assembling the above non-sintered nickel electrodes as positive electrode and a known paste-type cadmium electrode as negative electrodes, together with a nylon nonwoven separator, an alkaline electrolyte, a metal battery container, a metal lid and other battery parts. An aqueous solution (density: 1.285) of potassium hydroxide, sodium hydroxide and lithium hydroxide in a ratio by weight of 8:1:1 was used as the alkaline electrolyte.

The batteries A1 through A7 use active material powders which comprise composite particles comprising nickel hydroxide particles the surfaces of which are covered with mixed crystals of cobalt hydroxide-magnesium hydroxide, cobalt hydroxide-zinc hydroxide, cobalt hydroxide-indium hydroxide, cobalt hydroxide-aluminum hydroxide, cobalt hydroxide-magnesium hydroxide-zinc hydroxide, cobalt hydroxide-magnesium hydroxide-aluminum hydroxide and cobalt hydroxide-zinc hydroxide-indium hydroxide, respectively.

Comparative Example 1

To 1,000 ml of an aqueous solution of 14.3 g of a cobalt sulfate, 100 g of the same nickel hydroxide powder as used in Example 1 was added with stirring and a 1M aqueous sodium hydroxide solution was, with stirring, added dropwise to the mixture to a pH of 12, and the mixture was then allowed to stand for 1 hour. The obtained mixture was filtered, and the residue was washed with water and vacuum-dried to yield an active material powder which comprises composite particles comprising nickel hydroxide particles the surface of which is covered with cobalt hydroxide. The content of cobalt hydroxide in the composite particles was 5% by weight. A comparison battery X was prepared in the same manner as in Example 1 except for using the obtained active material powder. The comparison battery X was thus prepared nearly in accordance with the process disclosed in Japanese Patent Application Laid-open No. 234867/1987.

Comparative Example 2

To 1,000 ml of an aqueous solution of 14.3 g of cobalt sulfate and 4.52 g of nickel sulfate, 100 g of the same nickel hydroxide powder as used in Example 1 was added with stirring and a 1M aqueous sodium hydroxide solution was, with stirring, added dropwise to the mixture to a pH of 12, and the mixture was then allowed to stand for 1 hour. The obtained mixture was filtered, and the residue was washed with water and vacuum-dried to yield an active material powder which comprises composite particles comprising nickel hydroxide particles the surface of which is covered with a mixed crystal of cobalt hydroxide and nickel hydroxide. The content of nickel hydroxide in the mixed crystal was 20% by weight in terms of metal based on the total weight of cobalt and nickel contained in the mixed crystal. The content of the mixed crystal in the composite particles was 5% by weight. A comparison battery Y was prepared in the same manner as in Example 1 except for using the obtained active material powder. The comparison battery Y was thus prepared nearly in accordance with the process disclosed in Japanese Patent Application Laid-open No. 62457/1991.

Charge-discharge cycle characteristics of the batteries

The batteries A1 through A7 and the comparison batteries X and Y were subjected to a charge-discharge cycle test in which one cycle consists of charging at a charge current of 0.1C to 160% and then discharging at a discharge current of 1% to a terminal voltage of 1.0 V, to study their charge-discharge cycle characteristics.

FIG. 1 is a graph showing the charge-discharge characteristics of the batteries tested, with the ordinate representing the discharge capacity (an index assuming that the discharge capacity at the 1st cycle is 100) and the abscissa the number of charge-discharge cycles. As seen from FIG. 1, while the discharge capacity of the comparison batteries X and Y decreased as the charge-discharge cycles proceeded, that of the batteries A1 through A7 using the electrodes of the invention did not appreciably decrease. This is because with the batteries A1 through A7, each using composite particles comprising nickel hydroxide particles covered with a mixed crystal of cobalt hydroxide and the hydroxide of at least one metal (M) selected from the group consisting of aluminum, magnesium, indium and zinc, it is difficult for the cobalt hydroxide to diffuse into the nickel hydroxide particles.

It was also found, in separate experiments, that covering the surface of a solid solution particles comprising nickel hydroxide particles into which at least one element selected from calcium, zinc, cobalt or cadmium has been dissolved, with the above mixed crystals provides batteries having charge-discharge cycle characteristics of the same excellent level as that of the batteries A1 through A7.

Example 2

There were prepared non-sintered nickel electrodes for alkaline batteries using as active material composite particles comprising nickel hydroxide particles the surface of which was covered with mixed crystals of cobalt hydroxide and magnesium hydroxide each having a different content of magnesium hydroxide in terms of metal as follows: 0.1% by weight, 0.25% by weight, 0.5% by weight, 1% by weight, 5% by weight, 10% by weight, 25% by weight, 35% by weight, 50% by weight, 55% by weight or 60% by weight. Then, nickel-cadmium batteries B1 through B11 were prepared by using these electrodes in this order. With all of the electrodes, the content of the mixed crystal in the composite particles was adjusted to be 10% by weight.

Figure 2:
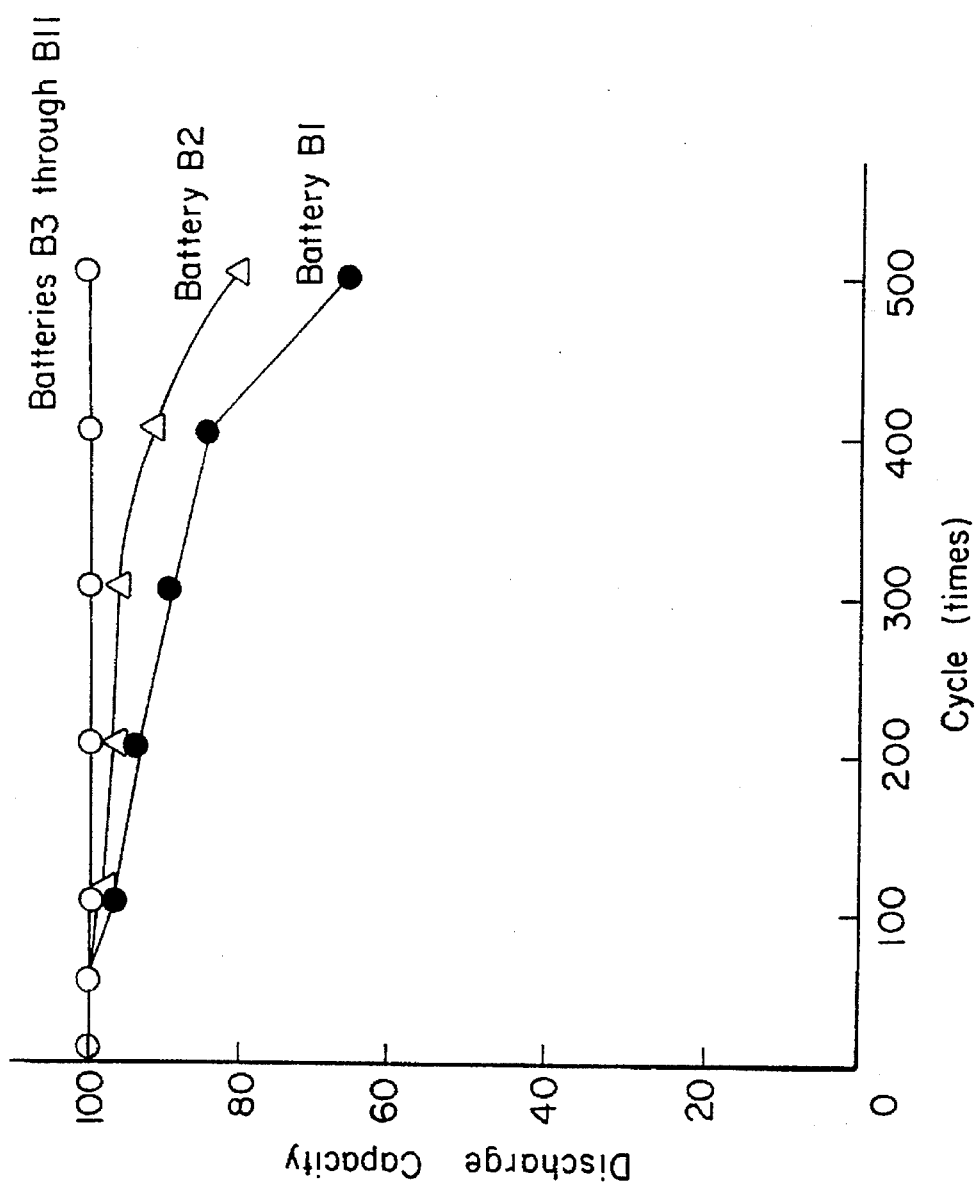
FIG. 2 is another graph showing the charge-discharge characteristic of the nickel-cadmium batteries prepared in Examples.

The batteries B1 through B11 thus prepared were subjected to the same charge-discharge cycle test as conducted in Example 1, to study their charge-discharge cycle characteristics. The results are shown in FIG. 2 with the same coordinate system as in FIG. 1 and in Table 1. Table 1 shows the discharge capacity at the 300-th cycle of each battery in terms of an index with that of the battery B4 being 100.

TABLE 1

| Battery | B3 | B4 | B5 | B6 | B7 | B8 | B9 | B10 | B11 |
|---|---|---|---|---|---|---|---|---|---|
| Content of Mg (% by weight) | 0.5 | 1 | 5 | 10 | 25 | 35 | 50 | 55 | 60 |
| Discharge capacity | 100 | 100 | 100 | 100 | 99 | 99 | 99 | 90 | 85 |

As seen from FIG. 2, the batteries B3 through B11, having a content of magnesium hydroxide in the mixed crystal of at least 0.5% by weight in terms of metal, have batter charge-discharge cycle characteristics than those of the batteries B1 and B2 with the content being less than 0.5% by weight. From this fact, it is understood that the content is desirably at least 0.5% by weight.

On the other hand, as seen from Table 1, the batteries B10 and B11, having a content of magnesium hydroxide in the mixed crystal exceeding 50% by weight in terms of metal, have a smaller discharge capacity than that of any one of the batteries B3 through B9 having the content of less than 50% by weight. From this fact, it is understood that the content is desirably not more than 50%. In summary, the content of magnesium hydroxide in the mixed crystal is desirably in a range of 0.5 to 50% by weight in terms of metal.

The content in the mixed crystal is desirably in a range of 0.5 to 50% also for zinc.

Example 3

There were prepared non-sintered nickel electrodes for alkaline batteries, using as active material, composite particles comprising nickel hydroxide particles the surface of which was covered with mixed crystals of cobalt hydroxide and magnesium hydroxide, with the content of the mixed crystals differing as follows: 0% by weight, 2% by weight, 3% by weight, 5% by weight, 10% by weight, 15% by weight, 20% by weight, 25% by weight, 26% by weight, 28% by weight and 30% by weight. Then, nickel-cadmium batteries C1 through C11 were prepared by using these electrodes in this order. With all of the electrodes, the content of magnesium hydroxide in the mixed crystal was adjusted to be 10% by weight.

The batteries C1 through C11 thus prepared were subjected to the same charge-discharge cycle test as conducted in Example 1, to study their discharge capacity at the 300-th cycle. The results are shown in FIG. 3 in which the ordinate represents the discharge capacity (in terms of an index with the discharge capacity of the battery C4 at the 10-th cycle being 100) of each battery at the 300-th cycle and the abscissa the content (% by weight) of mixed crystal in the composite particles.

Figure 3:
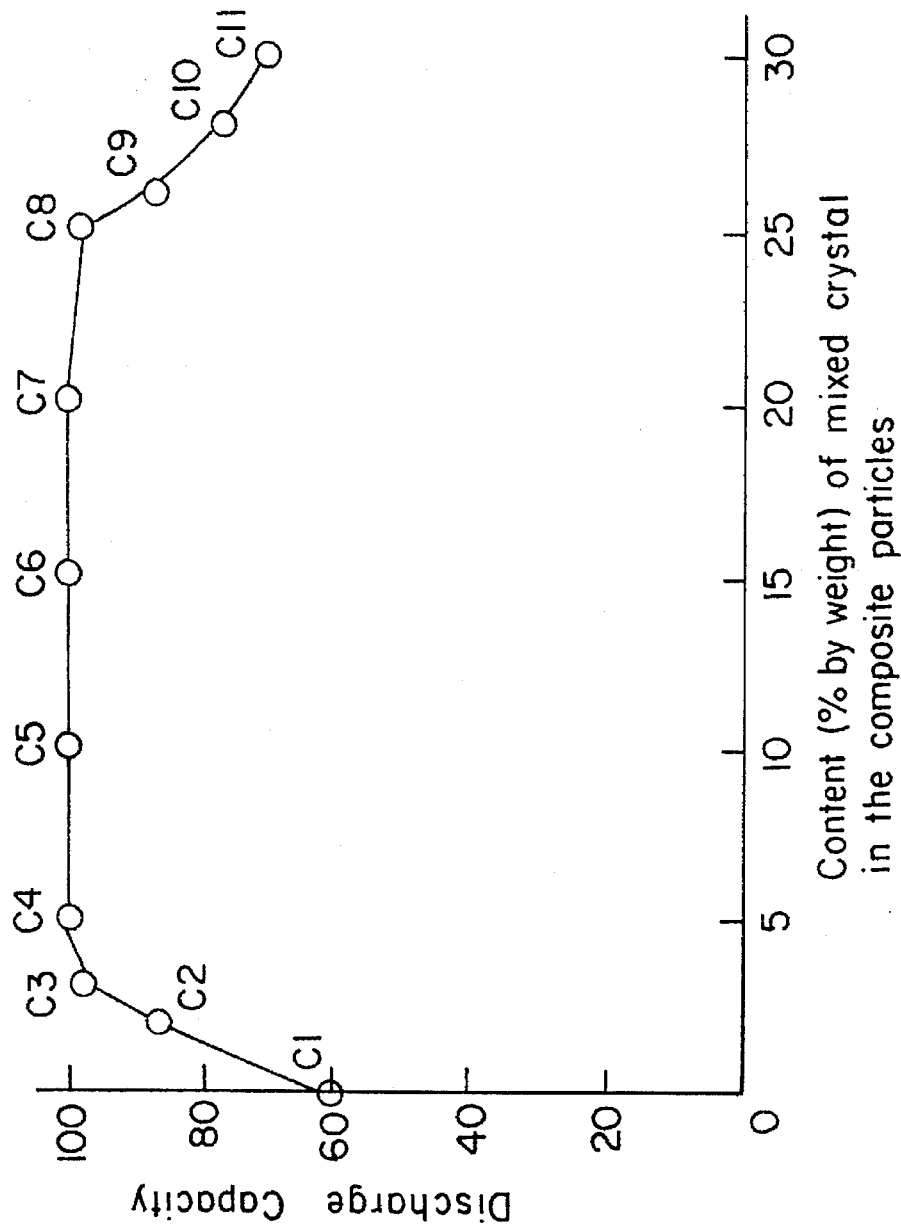
FIG. 3 is a graph showing the relationship between the content of mixed crystal in composite particles and the discharge capacity at the 300-th cycle.

As seen from FIG. 3, the batteries C3 through C8, having a mixed crystal content in a range of 3 to 25% by weight, have a large discharge capacity at the 300-th cycle than those of the batteries C1 and C2 and C9 through C11 with the content deviating from this range. From this fact, it is understood that the mixed crystal content in composite particles is desirably in a range of 3 to 25% by weight.

The desirable mixed crystal content is also in a range of 3 to 25% for aluminum, indium and zinc, besides magnesium.

Example 4

There were prepared, in the same manner as in Example 1, non-sintered nickel electrodes for alkaline batteries, using as active material composite particles comprising nickel hydroxide particles the surface of which was covered with mixed crystals of cobalt hydroxide-magnesium hydroxide, cobalt hydroxide-zinc hydroxide, cobalt hydroxide-indium hydroxide or cobalt hydroxide-aluminum hydroxide, with the content of magnesium, zinc, indium or aluminum in the co-precipitates differing as shown in Table 2. Then, nickel-cadmium batteries were prepared by using these electrodes in the same manner as in Example 1. In every case, the content of co-precipitate (not of mixed crystal) in magnesium hydroxide in the mixed crystal was adjusted to be 10% by weight.

The batteries thus prepared were tested, in order to study the influence of the co-precipitate used, as follows.

Each of the batteries was subjected to 10 charge-discharge cycles where one cycle consisted of charging at a charge current of 0.1C to 160% and discharging at a discharge current of 1C to a terminal voltage of 1.0 V, and then charged at a charge current of 0.1C to 160%. Each battery thus charged was, while being connected to a resistor of 5Ω, allowed to stand at a temperature of 70° C. for 7 days. The batteries were then charged at a charge current of 0.1C to 160% and discharged at a discharge current of 1C to a terminal voltage of 1.0 V and, thereafter, tested for discharge capacity, D1. The ratio (%) between D1 and the discharge capacity D2 at the 10-th cycle for each battery was obtained. The results are shown in Table 2. A larger value of this ratio indicates that the discharge capacity decreases, after the battery is connected to a load, to a smaller extent.

TABLE 2

| Content of metal (M) in co-precipitate (%) [M/(Co + M) × 100] | 0 | 0.5 | 1 | 5 | 10 | 25 | 35 | 50 | 55 |
|---|---|---|---|---|---|---|---|---|---|
| Type of metal | | | | | | | | | |
| Magnesium | | 94 | 96 | 97 | 98 | 96 | 95 | 94 | 90 |
| Zinc | | 86 | 92 | 93 | 92 | 93 | 92 | 87 | 86 |
| Indium | | 77 | 76 | (Mixed crystal not formed.) | | | | | |
| Aluminum | | 80 | 82 | (Mixed crystal not formed.) | | | | | |
| (Co(OH)$_2$ alone) | 72 | | | | | | | | |

It is understood from Table 2, that non-sintered nickel electrodes using as active material composite particles comprising nickel hydroxide particles the surface of which is covered with cobalt hydroxide-magnesium hydroxide co-precipitate or cobalt hydroxide-zinc hydroxide co-precipitate provide batteries the discharge capacity of which decreases, after they are connected to load, only slightly. This is considered to be due to the fact that the co-precipitates of cobalt hydroxide and magnesium hydroxide and those of cobalt hydroxide and zinc hydroxide are present while having the structure of mixed crystal in wide composition ranges. In particular, the cobalt hydroxide-magnesium hydroxide co-precipitates yielded batteries with the smallest decrease in the discharge capacity after deep discharge at high temperature under a loaded condition. As regards indium and aluminum, where the content of indium hydroxide or aluminum hydroxide is large, no mixed crystals were obtained due to separation of indium hydroxide or aluminum hydroxide.

Although the above Examples used as active material powder nickel hydroxide particles, use of solid solution particles consisting essentially of nickel hydroxide can produce the same excellent effect.

Although the above description has been made in the Examples while taking nickel-cadmium batteries as examples, the present invention is widely applicable to alkaline batteries in general, including nickel-hydrogen battery.

Obviously, numerous modifications and variations of the present invention are possible in light of the above teachings. It is therefore to be understood that within the scope of the appended claims, the invention may be practiced otherwise than as specifically described herein.

What is claimed is:

1. An active material powder for non-sintered nickel electrodes of alkaline batteries, which comprises composite particles comprising nickel hydroxide particles or solid solution particles consisting essentially of nickel hydroxide and a mixed crystal covering the surface thereof, said mixed crystal comprising cobalt hydroxide and a hydroxide of at least one metal (M) selected from the group consisting of aluminum, magnesium, indium and zinc.

2. The active material powder for non-sintered nickel electrodes of alkaline batteries according to claim 1, wherein said solid solution particles are nickel hydroxide particles in which at least one element selected from the group consisting of zinc, cobalt, calcium and cadmium has been dissolved.

3. The active material powder for non-sintered nickel electrodes of alkaline batteries according to claim 1, wherein said composite particles contain 3 to 25% by weight of said mixed crystal.

4. The active material powder for non-sintered nickel electrodes of alkaline batteries according to claim 1, wherein said mixed crystal comprises magnesium hydroxide and cobalt hydroxide, zinc hydroxide and cobalt hydroxide, or magnesium hydroxide, zinc hydroxide and cobalt hydroxide.

5. The active material powder for non-sintered nickel electrodes of alkaline batteries according to claim 4, wherein said mixed crystal contains 0.5 to 50% by weight in terms of metal of magnesium hydroxide and/or zinc hydroxide based on the total weight of cobalt, and magnesium and/or zinc.

6. The active material powder for non-sintered nickel electrodes of alkaline batteries according to claim 4, wherein said mixed crystal contains 0.5 to 50% by weight in terms of metal of magnesium hydroxide and/or zinc hydroxide based on the total weight of cobalt, and magnesium and/or zinc and said composite particles contain 3 to 25% by weight of said mixed crystal.

7. The active material powder for non-sintered nickel electrodes of alkaline batteries according to claim 1, wherein said mixed crystal comprises magnesium hydroxide and cobalt hydroxide.

8. A non-sintered nickel electrode for alkaline batteries, which uses an active material powder which comprises composite particles comprising nickel hydroxide particles or solid solution particles consisting essentially of nickel hydroxide and a mixed crystal covering the surface thereof, said mixed crystal comprising cobalt and a hydroxide of at least one metal (M) selected from the group consisting of aluminum, magnesium, indium and zinc.

9. The non-sintered nickel electrode for alkaline batteries according to claim 8, wherein said solid solution particles are nickel hydroxide particles in which at least one element selected from the group consisting of zinc, cobalt, calcium and cadmium has been dissolved.

10. The non-sintered nickel electrode for alkaline batteries according to claim 8, wherein said composite particles contain 3 to 25% by weight of said mixed crystal.

11. The non-sintered nickel electrode for alkaline batteries according to claim 8, wherein said mixed crystal comprises magnesium hydroxide and cobalt hydroxide, zinc hydroxide and cobalt hydroxide, or magnesium hydroxide, zinc hydroxide and cobalt hydroxide.

12. The non-sintered nickel electrode for alkaline batteries according to claim 11, wherein said mixed crystal contains 0.5 to 50% by weight in terms of metal of magnesium hydroxide and/or zinc hydroxide based on the total weight of cobalt, and magnesium and/or zinc.

13. The non-sintered nickel electrode for alkaline batteries according to claim 11, wherein said mixed crystal contains 0.5 to 50% by weight in terms of metal of magnesium hydroxide and/or zinc hydroxide based on the total weight of cobalt, and magnesium and/or zinc and said composite particles contain 3 to 25% by weight of said mixed crystal.

14. The non-sintered nickel electrode for alkaline batteries according to claim 8, wherein said mixed crystal comprises magnesium hydroxide and cobalt hydroxide.

* * * * *